(12) United States Patent
West

(10) Patent No.: US 9,015,954 B2
(45) Date of Patent: Apr. 28, 2015

(54) FRAME ASSEMBLY FOR SIMULATING TOPOGRAPHY OF A WALL PORTION

(71) Applicant: Colony Incorporated, Elgin, IL (US)

(72) Inventor: Kent G. West, Barrington Hills, IL (US)

(*) Notice: Subject to any disclaimer, the term of this patent is extended or adjusted under 35 U.S.C. 154(b) by 0 days.

(21) Appl. No.: 14/023,706

(22) Filed: Sep. 11, 2013

(65) Prior Publication Data

US 2014/0069045 A1    Mar. 13, 2014

Related U.S. Application Data

(60) Provisional application No. 61/700,113, filed on Sep. 12, 2012.

(51) Int. Cl.
*G01B 5/20* (2006.01)
*E04B 1/343* (2006.01)

(52) U.S. Cl.
CPC ..................................... *E04B 1/343* (2013.01)

(58) Field of Classification Search
USPC ............. 52/646, 38, 108, 202, 203, 364, 365, 52/762, 483.1, 482, 763; 248/542, 543, 248/544, 220.21, 220.22, 220.31; 269/55, 269/71, 291; 29/281.1; 33/561.1, 561.2, 33/561.3
See application file for complete search history.

(56) References Cited

U.S. PATENT DOCUMENTS

| | | | | |
|---|---|---|---|---|
| 68,487 A * | 9/1867 | Cassudey | | |
| 1,079,953 A * | 12/1913 | Sahm | ............................ | 33/561.3 |
| 1,258,357 A * | 3/1918 | Nevers | ............................ | 33/561.3 |
| 1,328,538 A * | 1/1920 | Newberg et al. | ............................ | 33/561.3 |
| 1,406,117 A * | 2/1922 | Vrooman | ............................ | 33/561.3 |
| 2,522,030 A * | 9/1950 | Fuqua | ............................ | 33/561.3 |
| 2,621,415 A * | 12/1952 | Cooper | ............................ | 33/561.1 |
| 2,704,893 A * | 3/1955 | Shane | ............................ | 425/262 |
| 2,852,854 A * | 9/1958 | Danen | ............................ | 33/561.3 |
| 3,771,273 A * | 11/1973 | Brodie | ............................ | 52/646 |
| 3,826,460 A * | 7/1974 | Cast | ............................ | 249/27 |
| 3,880,416 A * | 4/1975 | Horwitz | ............................ | 269/152 |
| 3,983,632 A * | 10/1976 | Halstead | ............................ | 33/561.1 |
| 4,353,171 A * | 10/1982 | Spears | ............................ | 33/521 |
| 4,467,990 A * | 8/1984 | Wiseman | ............................ | 248/220.31 |
| 4,658,560 A * | 4/1987 | Beaulieu | ............................ | 52/646 |
| 4,668,462 A * | 5/1987 | Smith | ............................ | 264/320 |
| RE32,936 E * | 5/1989 | Smith | ............................ | 264/320 |
| 4,921,204 A * | 5/1990 | Melfi | ............................ | 249/2 |
| 5,269,112 A * | 12/1993 | Weinrub et al. | ............................ | 52/646 |
| 5,305,992 A * | 4/1994 | Kish | ............................ | 269/51 |
| 5,379,561 A * | 1/1995 | Saito | ............................ | 52/235 |
| 5,419,055 A * | 5/1995 | Meadows | ............................ | 33/518 |
| 5,560,116 A * | 10/1996 | Tobia | ............................ | 33/365 |
| 5,564,235 A * | 10/1996 | Butler | ............................ | 52/126.6 |
| 6,167,633 B1 * | 1/2001 | Amara | ............................ | 33/561.2 |
| 2001/0029679 A1 * | 10/2001 | Peters | ............................ | 33/561.3 |
| 2003/0046801 A1 * | 3/2003 | Engstrom et al. | ............................ | 29/281.4 |
| 2007/0284493 A1 * | 12/2007 | Christman | ............................ | 248/220.21 |
| 2008/0104816 A1 * | 5/2008 | Tornero | ............................ | 29/428 |

\* cited by examiner

*Primary Examiner* — Robert Canfield
*Assistant Examiner* — Matthew Gitlin
(74) *Attorney, Agent, or Firm* — Olson & Cepuritis, Ltd.

(57) ABSTRACT

A frame assembly for simulating topography of an existing wall portion provides points of adjustment behind a wallboard panel mounted to the frame assembly. In this manner imperfections in an existing wall can be replicated to facilitate cabinet or countertop installation.

4 Claims, 7 Drawing Sheets

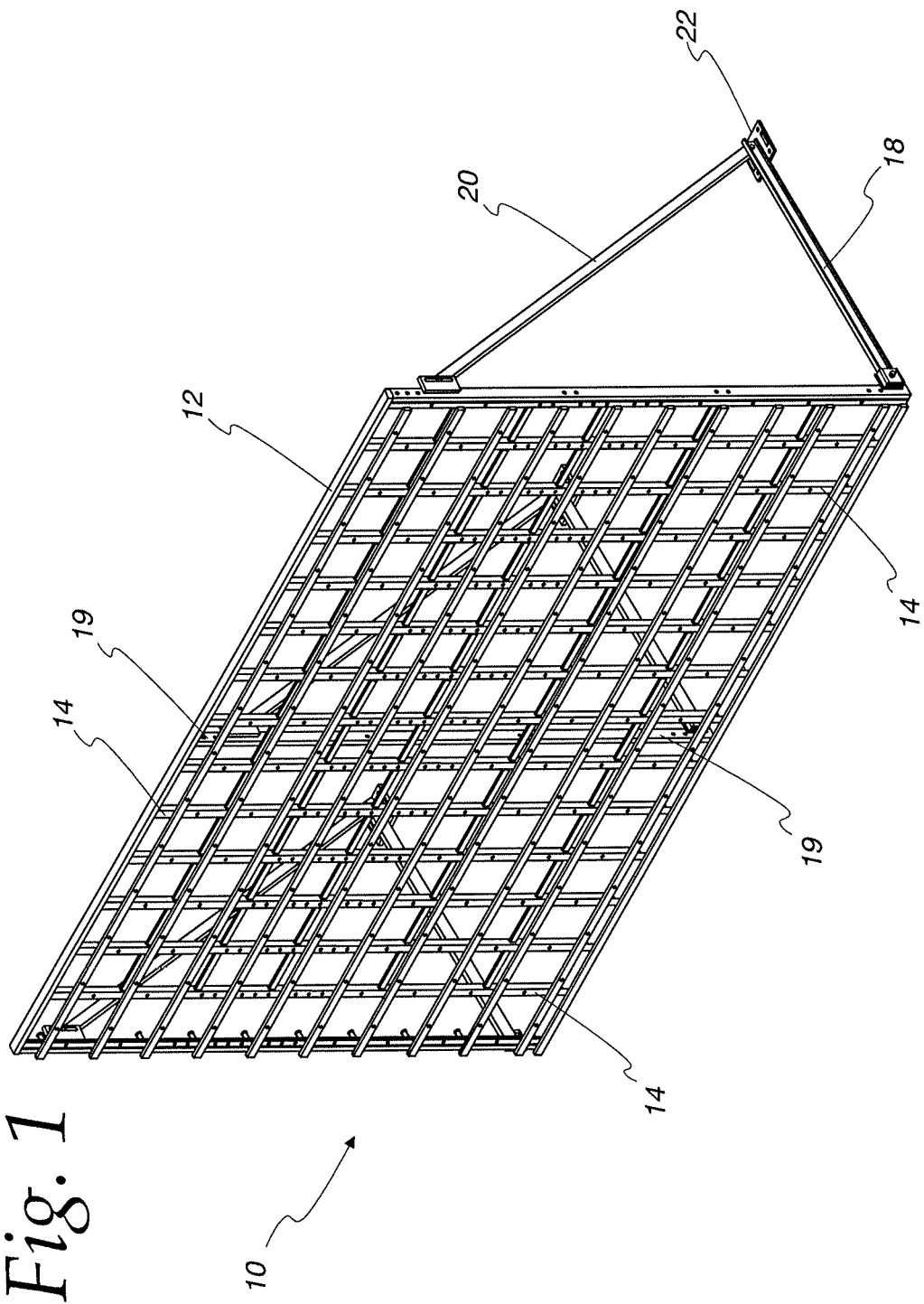

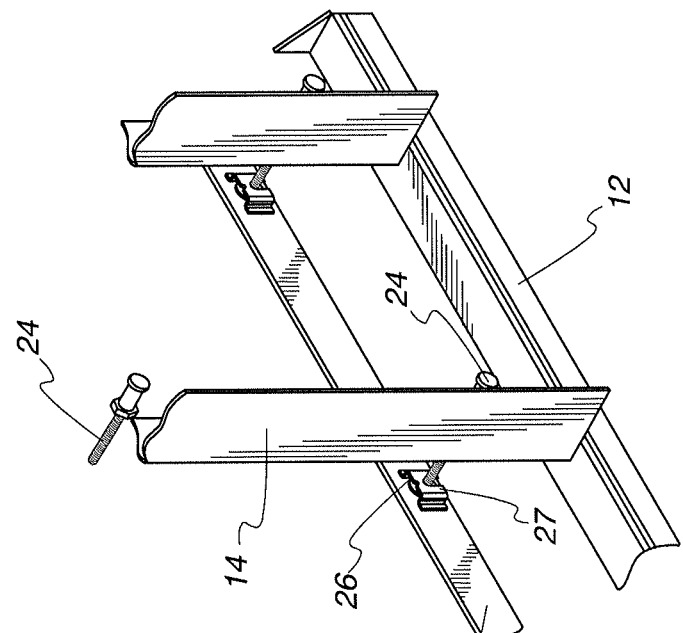
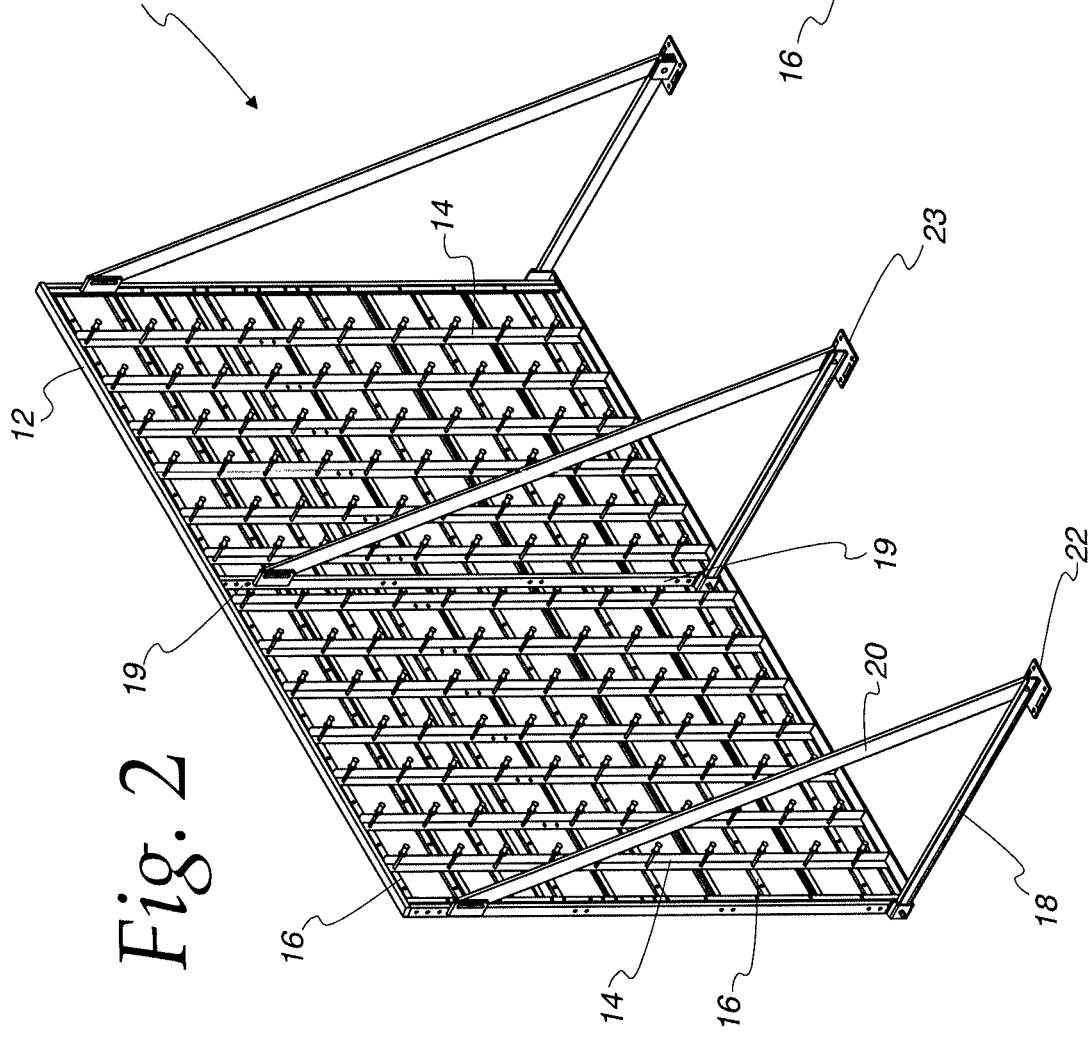

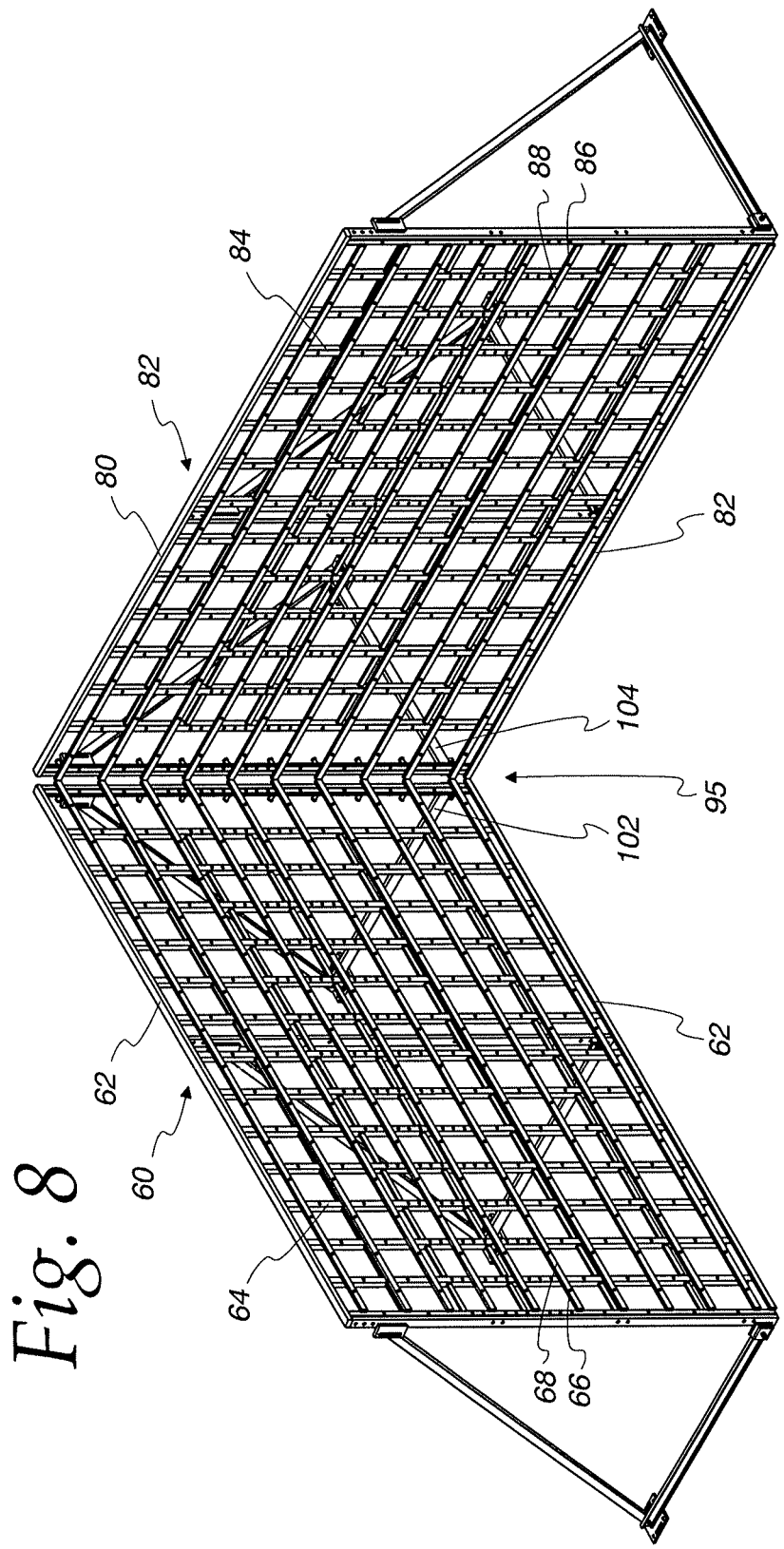

9,015,954 B2

FRAME ASSEMBLY FOR SIMULATING TOPOGRAPHY OF A WALL PORTION

CROSS-REFERENCE TO RELATED APPLICATION

This application claims the benefit of U.S. Provisional Application No. 61/700,113, filed on Sep. 12, 2012, which is incorporated herein by reference in its entirety.

FIELD OF INVENTION

This invention relates to a device for providing a replica of an existing wall or portion of a wall.

BACKGROUND OF THE INVENTION

The walls of a home are not necessarily true and flat, but may exhibit inconsistencies in trueness, flatness, or both. When it is desired to install cabinets such as kitchen cabinets in a customer's residence, often a considerable time and effort is spent in conforming the rear of a prefabricated cabinet to an existing wall where the cabinet is to be installed. The present device facilitates cabinet and countertop installation by providing a device that simulates an existing wall so that the rear of a cabinet or countertop can be appropriately modified at factory so as to be complementary to the wall portion at the installation site.

SUMMARY OF INVENTION

A frame assembly is provided for simulating the topography of an existing wall portion by providing strategically positioned points of adjustment behind a wallboard panel which permits a fabrication to mimic or replicate imperfections present in an existing wall where a cabinet is to be hung or a countertop installed, thereby minimizing installation time.

The frame assembly includes a metal frame to which is mounted an array of spaced columns. The columns are mounted in a substantially parallel relationship to one another and at spaced intervals from one another.

A plurality of threaded, dish-headed bolts is present in each of the columns. These bolts are threadedly received in the columns and are situated spaced from one another.

Plural weldments extend across the columns, usually at about right angles relative to the columns so as to define a quadrilateral grid with the columns. On one side thereof each weldment is provided with spaced pockets each sized to receive a head portion of one of the dish-headed bolts.

Wood slats are carried by the weldments and a wallboard panel is, in turn, is mounted to the wood slats.

Once the topography of a particular wall is determined by measurement, for example, by laser beam scanning, this topography can be replicated by the frame assembly by adjusting inwardly or outwardly, as required, individual dish-headed bolts so as to conform a wallboard panel carried by the frame to the particular wall.

BRIEF DESCRIPTION OF DRAWINGS

In the drawings,
FIG. 1 is a perspective front view of a frame assembly embodying the present invention;
FIG. 2 is a perspective back view of the frame assembly shown in FIG. 1;
FIG. 3 is a detail view showing a preferred relationship between the columns and the weldments in the frame assembly;
FIG. 8 shows a pair of frame assemblies embodying the present invention and pivotably joined together at about a right angle.

DETAILED DESCRIPTION OF PREFERRED EMBODIMENTS

Figure 4:
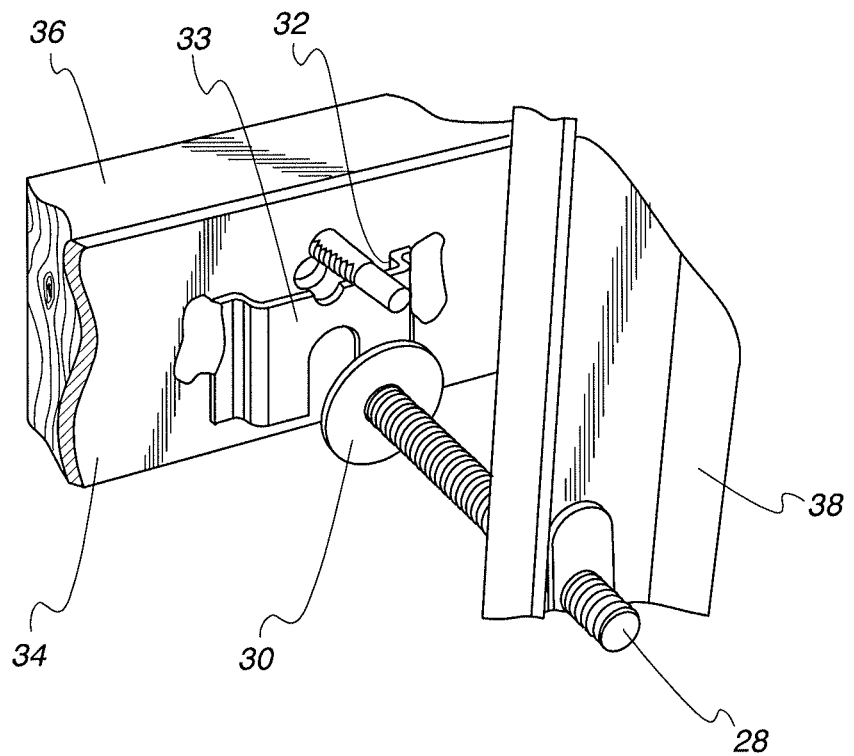
FIG. 4 is an enlarged exploded detail view showing a weldment carrying a wood slat about to be mounted to the frame.

Referring to FIGS. 1 and 2, frame assembly 10 has peripheral metal frame 12, an array of spaced columns 14, and weldments 16 carried by columns 14. Optional skeleton tube 19 contributes to the rigidity of metal frame 12. Frame assembly 10 is held in an upright position by horizontal support channels such as channel 18 and support tubes such as support tube 20. Horizontal support channel 18 and support tube 20 are connected to one another at floor weldment 22. Support tube 21 is connected to floor weldment 23 and skeleton tube 19.

FIG. 3 shows a dish-headed bolt, such as dish-headed bolt 24, received in pocket 26 defined by mounting clip 27 on one side of weldment 16. Preferably, the dish-headed bolt 24 is a sex bolt or a barrel bolt.

As can best be seen in FIG. 4, dish-headed bolt 28 terminating at its distal end in a dish 30 is sized to be received in pocket 32 of weldment 34 defined by mounting clip 33. Wood slat 36 is secured to weldment 34 on the side opposite that equipped with pocket 32. Dish-headed bolt 28 is threadedly received in column 38.

Figure 5:
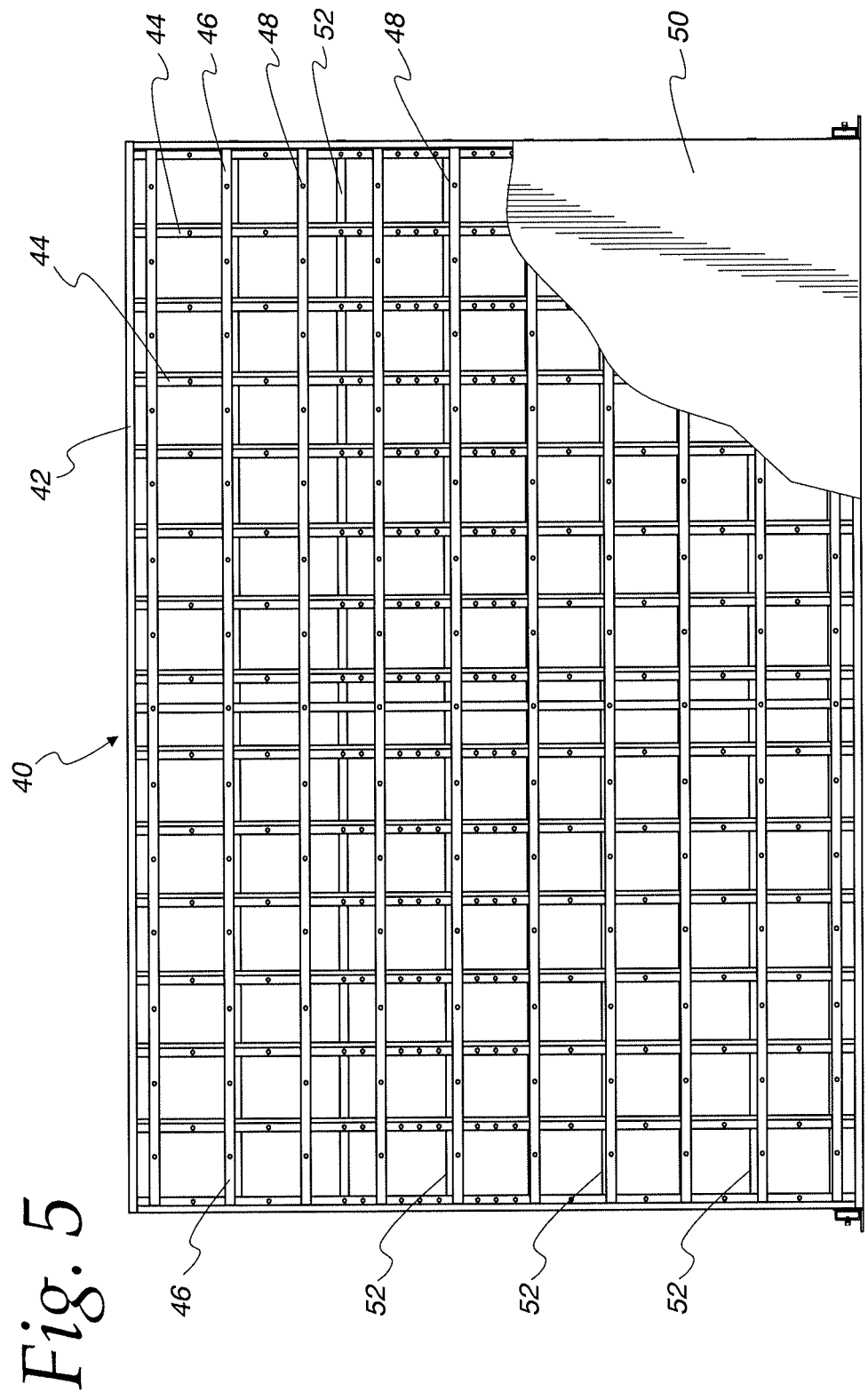
FIG. 5 is a front elevational view of a frame assembly embodying the present invention with wood slats and a fragment of a wallboard mounted thereon.
Figure 7:
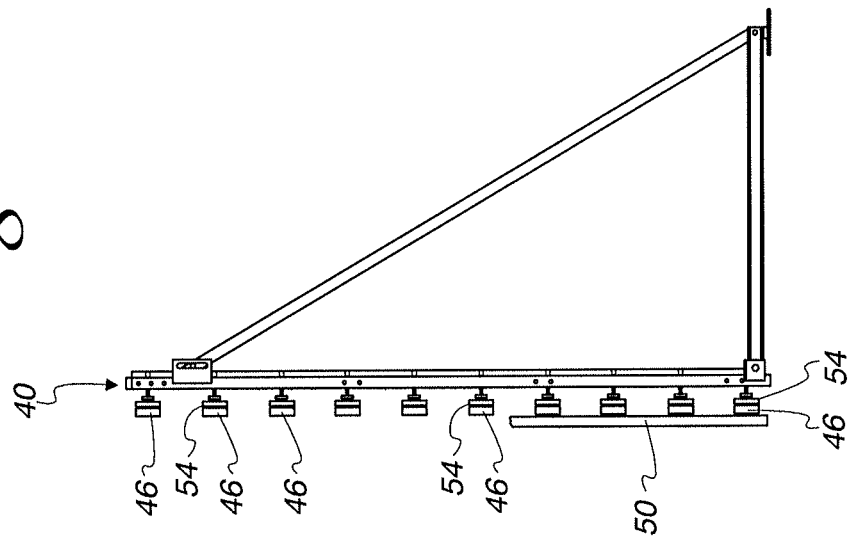
FIG. 7 is a side elevational view of the frame assembly shown in FIG. 5.
Figure 6:
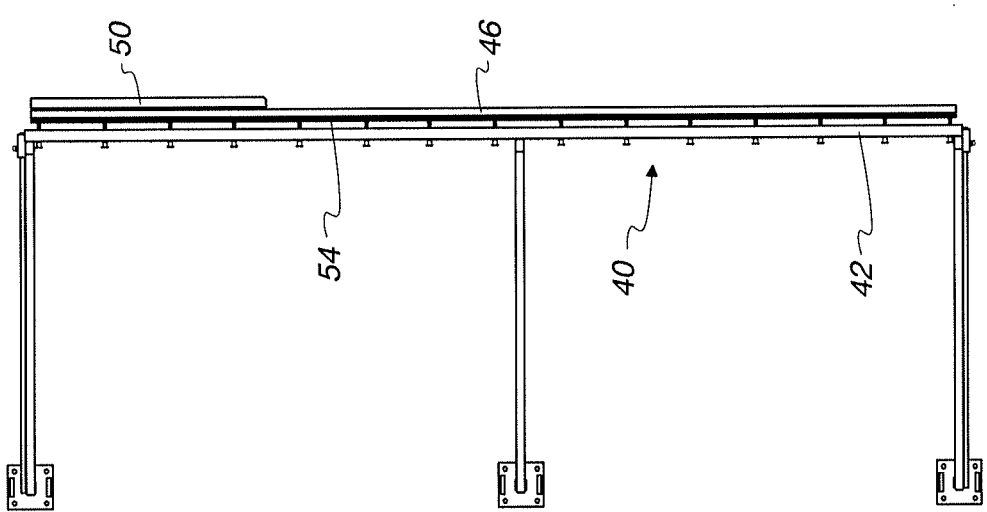
FIG. 6 is a top plan view of the frame assembly shown in FIG. 5.

Referring to FIGS. 5, 6 and 7, frame assembly 40 has outer metal frame 42 and an array of substantially parallel columns 44 mounted therein and spaced from one another. Wood slats 46 are attached to underlying flexible elongated weldments (see FIG. 6), carried by columns 44, by through fasteners, e.g., screws 48, and the like. Wallboard 50, in turn, is mounted to wood slats 46 in any convenient manner.

Transverse cross-members 52 can be provided to rigidify frame 40, if desired.

FIG. 8 shows a pair of frame assemblies 60 and 80 pivotably joined at 95 and arranged to form about a right angle with respect to one another. The included angle between frame assemblies 60 and 80 can be adjusted, however, as desired. Frame assembly 60 has outer frame 62, an array of substantially parallel columns 64 and spaced weldments 66 carrying wood slats 68. Likewise, frame assembly 80 has an outer frame 82, an array of parallel columns 84, spaced weldments 86 and wood slats 88 attached to weldments 86.

Figure 9:
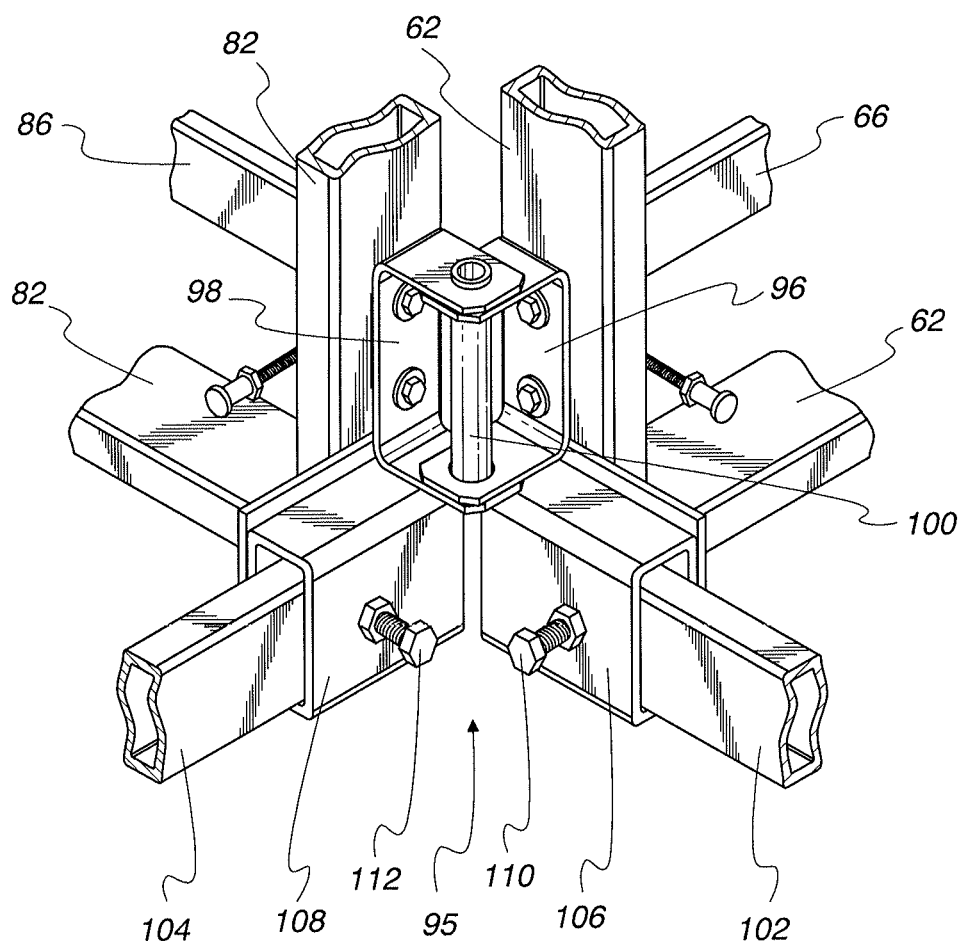
FIG. 9 is an enlarged detail view showing a pivotable joint between the frame assemblies of FIG. 8.

FIG. 9 shows joint 95 pivotably connecting frames 62 and 82 so that the included angle therebetween can be adjusted. Adjustment is achieved by hinge 92 which comprises hinge brackets or mounts 96 and 98, as well as hinge pin or tube 100. Horizontal supports 102 and 104 are received in respective horizontal support securement channels 106 and 108 and are held in place by bolts 110 and 112.

The frame assembly described hereinabove provides a multi-axis system that can adjust also for a varying angle between a wall and the contiguous floor for plumbers, for a varying angle between contiguous side walls that may not be at a right angle relative to one another, as well as for inward or outward bow of a side wall both vertically and horizontally. These features assist in custom configuration of cabinets in advance of installation in a customer's home and with minimal disruption of the cabinets themselves. Countertop fabrication prior to installation in a customer's home is facilitated as well.

The foregoing description and the drawings illustrate the present invention, but are not to be construed as limiting. Still other variants and arrangements of parts within the spirit and scope of this invention are possible and will readily present themselves to those skilled in the art.

The invention claimed is:

1. A frame assembly for simulating topography of an existing wall portion which comprises
   a metal frame;
   an array of elongated columns mounted to the frame substantially parallel to one another and at spaced intervals from one another;
   a plurality of threaded, dish-headed bolts in each said column spaced from one another;
   weldments, each comprising an elongated, flexible metal band extending across said columns and provided on one side thereof with spaced pockets each sized to receive a head portion of one of said dish-headed bolts; and
   wood slats carried by said weldments.

2. The frame assembly in accordance with claim 1 wherein a wallboard panel is mounted to the wood slats.

3. A pair of frame assemblies pivotably joined to one another for simulating topography of existing adjacent wall portions defining therebetween an angle of less than pi radians, each frame assembly of said pair comprising
   a metal frame;
   an array of elongated columns mounted to the frame substantially parallel to one another and at spaced intervals from one another;
   a plurality of threaded, dish-headed bolts in each said column spaced from one another;
   weldments, each comprising an elongated, flexible metal band extending across said columns and provided on one side thereof with spaced pockets each sized to receive a head portion of one of said dish-headed bolts; and,
   wood slats carried by said weldments.

4. The pair of frame assemblies in accordance with claim 3 wherein a wallboard panel is mounted to the wood slats.

* * * * *